US005115381A

United States Patent [19]

Van Heeswijk

[11] Patent Number: 5,115,381

[45] Date of Patent: May 19, 1992

[54] MOTOR VEHICLE HEADLAMP AND REFLECTOR BODY FOR SAME

[75] Inventor: Johannes A. A. M. Van Heeswijk, Eindhoven, Netherlands

[73] Assignee. U.S. Philips Corporation, New York, N.Y.

[21] Appl. No.: 619,168

[22] Filed: Nov. 26, 1990

[30] Foreign Application Priority Data

Dec. 21, 1989 [NL] Netherlands ........................ 8903129

[51] Int. Cl.[5] ........................ B60Q 1/04

[52] U.S. Cl. ........................ 362/61; 362/226; 362/285

[58] Field of Search ................ 362/433, 61, 263, 285, 362/418, 226, 296

[56] References Cited

U.S. PATENT DOCUMENTS 4,631,651 12/1986 Bergin et al. ........................ 362/61
4,682,274 7/1987 Frendenreich ........................ 362/226
4,851,976 7/1989 McMahan et al. .................. 362/61
4,920,463 4/1990 Montet ........................ 362/226
4,947,078 8/1990 Rice et al. ........................ 362/285
4,947,294 8/1990 Van Duyn et al. .................. 362/61
4,950,942 8/1990 Braun et al. ........................ 362/226

FOREIGN PATENT DOCUMENTS 2834968 2/1980 Fed. Rep. of Germany ........ 362/61
2835560 2/1980 Fed. Rep. of Germany ........ 362/61

*Primary Examiner*—Ira S. Lazarus
*Assistant Examiner*—Y. Quach
*Attorney, Agent, or Firm*—Robert J. Kraus

[57] ABSTRACT

A motor vehicle headlamp has a light source (4) with an axis (5) and is mounted in an accurately defined position relative to reference tabs (15) of a positioning member (14). To this end, the lamp has at its base a holder body (10) which includes a retaining member (12) which is adjustably fastened to the lamp vessel (1), a coupling member (16) which is telescopically aligned with and fastened to the retaining member (12), and a positioning member (14) fastened to the coupling member. The coupling member (16), before being fixed in position, can be shifted in two mutually perpendicular directions over a surface (19) of the positioning member (14). A reflector body for the headlamp has an opening having a boundary wherein a pressure member is provided and which bears against a flanged tongue (41) of the positioning member (14) when the headlamp is placed in the reflector body, thereby maintaining the headlamp in position.

7 Claims, 3 Drawing Sheets

MOTOR VEHICLE HEADLAMP AND REFLECTOR BODY FOR SAME

BACKGROUND OF THE INVENTION

1. Field of the Invention

The invention relates to a motor vehicle headlamp comprising:

- a translucent lamp vessel which is sealed in a vacuum-tight manner and having an axis and an end portion having a seal;
- a light source having an axis and positioned in the lamp vessel;
- current supply conductors connected to the light source and which extend from the lamp vessel to the exterior; and
- a holder body provided with
  - mutually insulated electrical contacts facing away from the lamp vessel, which contacts are connected to the current supply conductors;
  - a metal retaining member which is adjustably fastened to the end portion of the lamp vessel and which has a portion which extends in substantially the same direction as the axis of the lamp vessel;
  - a positioning member having reference tabs for positioning the lamp vessel inside a reflector body; and
  - a metal coupling member connected to the positioning member and telescopically fastened to the retaining member.

The invention also relates to a reflector body provided with an opening which has a boundary for cooperating with the holder body of a motor vehicle headlamp.

2. Description of the Related Art

Such a lamp having such a reflector body are known for U.S. Pat. No. 4,634,920.

In the known lamp, the light source is aligned relative to the references of the positioning member by shifting the metal retaining member up to the correct depth in the coupling member and tilting and/or rotating the retaining member. This alignment is necessary for each individual lamp because the position of the light source in the lamp vessel differs from lamp to lamp.

A disadvantage of the known lamp is that although its construction does make it possible to arrange so that a particular point of the light source, for example the center thereof is, in a pre-determined position relative to the reference tabs of the positioning member, that does not apply to the entire light source. Thus, the light source may be positioned askew in the lamp vessel when the light source is positioned longitudinally therein, so that it is not possible to assure that the light source coincides with a reference line determined by the reference tabs. In addition, it may be impossible in the case of a transversely positioned light source to give the axis of the light source the correct direction and at the same time correctly position the light source relative to the reference tabs.

The accurate alignment of the light source relative to references is equally impossible in the motorcar headlamp disclosed in, for example, U.S. Pat. No. 4,119,877. Here the lamp vessel is rigidly connected to a holder body without alignment of the light source, while the light source is subsequently aligned relative to a positioning member, a ring not shown in the said patent, which ring is then fastened to the coupling member.

An incorrect position of a light source, especially of a light source which is to produce a passing beam, is undesirable, however, since it can cause glare.

SUMMARY OF THE INVENTION

An object of the invention is to provide a lamp of the type described in the opening paragraph which is of a simple construction and which renders it possible inter alia to position the light source accurately relative to the reference tabs.

According to the invention, this is achieved in that the positioning member is a separate metal part of the holder body to which the coupling member is fastened, and in that the coupling member, before being fastened to the positioning member, can be shifted in mutually perpendicular directions over a surface of the positioning member.

It is advantageous if the coupling member is provided with an outwardly flanged rim, possibly interrupted for example in the form of outwardly flanged tabs which make contact with the positioning member. This is because welded joints, for example resistance welds or laser welds, can then be realised more easily.

The positioning member may be plate-shaped and may carry the contacts of the lampholder. Alternatively, the positioning member may be ring-shaped while the coupling member carries the contacts, which contacts are accessible through the opening in the ring-shaped positioning member.

The light source may be, for example, a helically coiled incandescent body or a pair of electrodes between which a discharge takes place during operation. In this latter case the line connecting the electrodes, the centreline of the discharge, is the axis of the light source. The light source axis may be approximately in axial direction of the lamp vessel or transverse to it.

The metal retaining member may be provided with resilient tabs which keep the end portion of the lamp vessel clamped in, as disclosed in U.S. Pat. No. 4,119,877 cited. Alternatively, it is possible for the retaining member to comprise a tubular section which grips with clamping fit around the end portion.

The retaining member may grip around the coupling member with the portion which extends along the axis of the lamp vessel, or it may lie inside this coupling member. A close fit of these parts is not necessary if they are interconnected with laser welds or with solder. If resistance welding is used, the member surrounding the other member may comprise tongues which are pressed against the other member during welding, such as is the case in, for example, U.S. Pat. No. 4,634,920 cited.

The retaining member may be permanently connected to a reflector body, the reflector body surrounding the light source in order to form a sealed-beam lamp. Alternatively, the lamp may be mounted exchangeably in a reflector. It is usual in this case for a positioning member and the boundary of the opening in a reflector body, through which the lamp vessel is inserted in the reflector, to be shaped in such a way that the lamp can only be accommodated in the reflector body in one rotational position around its own axis. This, however, does not always guarantee that the light source will take up the correct position inside the reflector body. Both the opening in the reflector body and the positioning member may have a dimensional spread, so that a mounted lamp may be displaced sideways to a lesser or greater extent.

In a particular embodiment, the positioning member has a circumferential comprising a first and a second circumference portion which lie on the same circle and which make an acute angle with one another. These portions are designed to cooperate with support surfaces present on respective legs to a V and lying on the boundary of an opening in the reflector body. The circumference of the positioning member further carries a tab designed to cooperate with the reflector body and restricting the possibility of the lamp rotating about its own axis in the reflector body. Opposite the circumferential portions there is a pressure application spot at the holder body, for example at the coupling member or at the positioning member (element 41 in FIG. 2). Upon insertion in a reflector, a pressure member bears on this spot, pressing the positioning member against the support surfaces lying on the legs of a V. In this way the electrical element of each lamp takes up an accurately determined position inside the reflector body if the positioning member was held in a corresponding way in an aligning unit during the alignment of the electrical element.

It is favourable to bend out the positioning member cylindrically in the location of the first and the second circumferential portions and in the location of the pressure application spot. It can thus be prevented, in the case of use of a synthetic material in the reflector body, that the positioning member is pressed into the synthetic material, which would adversely affect the accuracy of lamp positioning.

The reflector body according to the invention is characterized in that the boundary of the opening has a first and a second support surface lying on the legs of a V having an obtuse angle, and in that it comprises on the opposite side a pressure member aimed in the direction of the bisector of the V.

BRIEF DESCRIPTION OF THE DRAWINGS

Embodiments of the motor vehicle headlamp and the reflector body according to the invention are shown in the drawings, in which.

DESCRIPTION OF THE PREFERRED EMBODIMENTS

Figure 1:
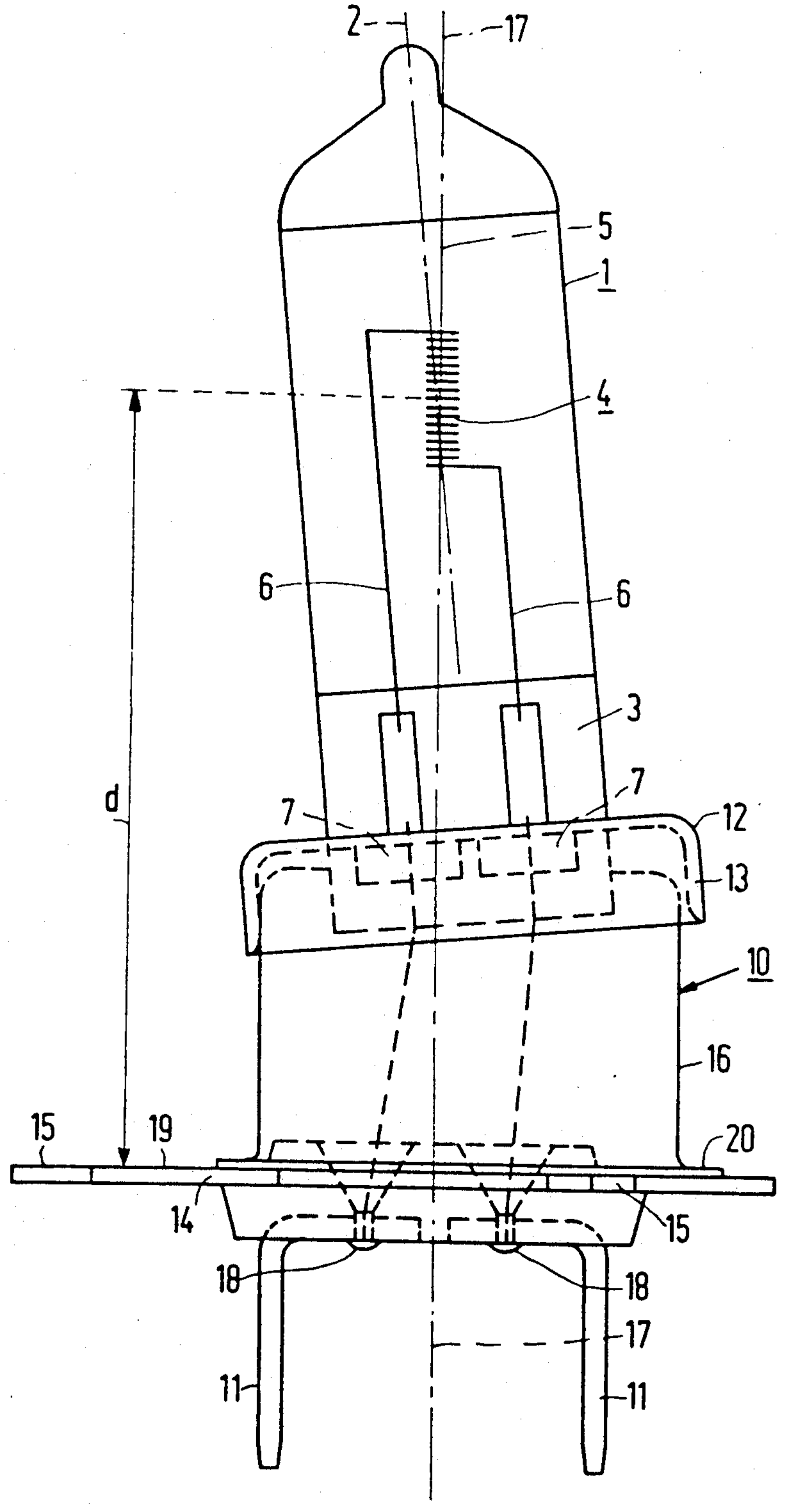
FIG. 1 shows an embodiment of a lamp in side elevation.

The motor vehicle headlamp of FIG. 1 has a translucent lamp vessel 1, which is sealed in a vacuum-tight manner, and which is made of, for example, glass, for example with an $SiO_2$ content of at least 95% by weight, such as quartz glass. The lamp vessel has an axis 2 and a seal 3. A light source 4 having an axis 5 is arranged in the lamp vessel. In the drawing, the direction of the axis 5 deviates by an acute angle from the direction of the axis 2 of the lamp vessel. The deviation is represented on an exaggerated scale. Current supply conductors 6, which project from the lamp vessel 1 to the exterior, are connected to the light source 4, shown as an incandescent body of, for example, tungsten in the drawing. A holder body 10 has mutually insulated electrical contacts 11 which are connected to the current supply conductors, for example with soldered joints 18. A metal retaining member 12 having a portion 13 extending along the axis 2 of the lamp vessel 1 is fastened to the end portion seal 3 of the lamp vessel 1 without cement, for example by means of resilient tabs 7 stamped from the retaining member. A positioning member 14 of the holder body 10 has reference tabs 15 for positioning the lamp inside a reflector body.

A metal coupling member 16 is connected to the positioning member 14 and fastened to the retaining member 12, for example by means of laser welds.

The positioning member 14 is a separate metal part of the holder body 10, to which the coupling member 16 is fastened with the light source 4 in a pre-determined position relative to this positioning member 14, in the drawing perpendicular thereto, but in an alternative embodiment, for example, parallel thereto.

In FIG. 1, the positioning member 14 carries the contacts 11. This member 14 has a reference line 17 whose position is determined by reference tabs 15. In the lamp shown the incandescent body 4 should being positioned on the reference line 17, be concentric with it, and furthermore should be at a pre-determined distance d from the positioning member 14. This is realised in spite of the skew position of the incandescent body 4 in the lamp vessel 1 in that the holder body 10 has two joints which are fixed after adjustment: a first joint between the retaining member 12 and the coupling member 16, and a second joint between the coupling member 16 and the positioning member 14. Rotation about the axis 2 of the lamp vessel 1 may be possible around the first joint if the said members are constructed as circular cylinders, which may be important in the case of an asymmetrical light source, for example, a light source which cooperates optically with a dipping cap. Furthermore, tilting of the lamp vessel 1 is possible in order to align the axis 5 of the incandescent body 4 relative to the reference line 17. Shifting of the said members 12, 16 relative to one another is also possible in order to set the distance d. The second joint, between the members 14 and 16, makes it possible to have the axis 5 coincide with the reference line 17 by shifting the coupling member 16 over the surface 19 in two mutually perpendicular directions. In addition, the coupling member 16 can be rotated if the light source 4 itself, or in conjunction with a dipping cap, is not rotationally symmetrical. In fact, this renders it unnecessary for the joint between the members 12 and 16 to be capable of rotation. The coupling member 16 has a flanged rim 20 on which, for example, welded joints with the positioning member are made.

Figure 2:
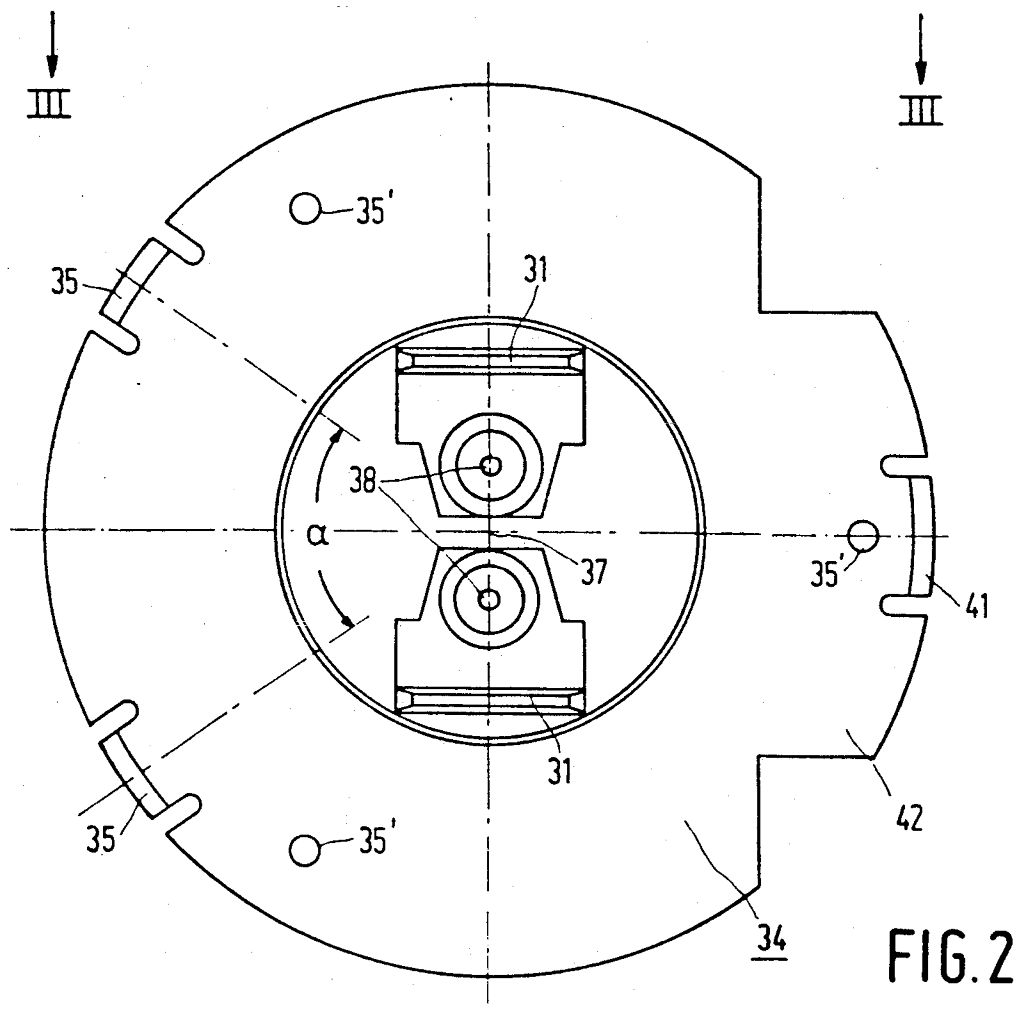
FIG. 2 shows another embodiment of a positioning member in an elevation of the side facing away from a lamp vessel.
Figure 3:
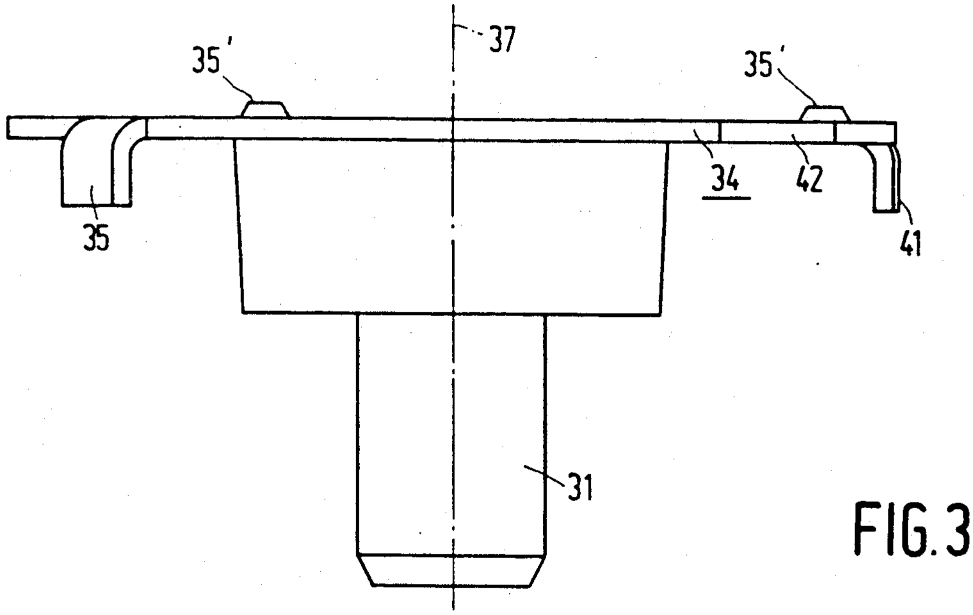
FIG. 3 shows the positioning member of FIG. 2 taken on III.

In FIGS. 2 and 3, parts corresponding to parts in FIG. 1 have been given reference numerals which are 20 higher.

The positioning member 34 has references 35, which determine the spot where the imaginary reference tabs line 37 intersects the member, and references 35' in the form of stamped elevations which define a plane to which the reference line 37 is perpendicular. This fully defines the reference line. The distance d from the light source (4 in FIG. 1) to the positioning member is determined in these figures by the tops of the stamped elevations 35'. The reference tabs 35 in these figures are cylindrically flanged tongues which form a first and a second circular circumferential portion of the positioning member 34. The centre lies at 37. The reference tabs are at an acute angle $\alpha$ relative to one another. Opposite these reference tabs there is a pressure application spot 41, which in the figures also is a cylindrically flanged tongue. The positioning member 34 has at its circumference a projecting tab 42 which has the function of limiting the possibility of rotation of the member in conjunction with a reflector body. In the figures, this tab lies within the circle on which the reference tabs 35 lie, but in alternative embodiments this tab may project outside such circle. It is also possible for the tab to extend over a much greater angle around the reference line 37 towards the reference tabs 35 or, alternatively, to lie between these references.

Figure 4:
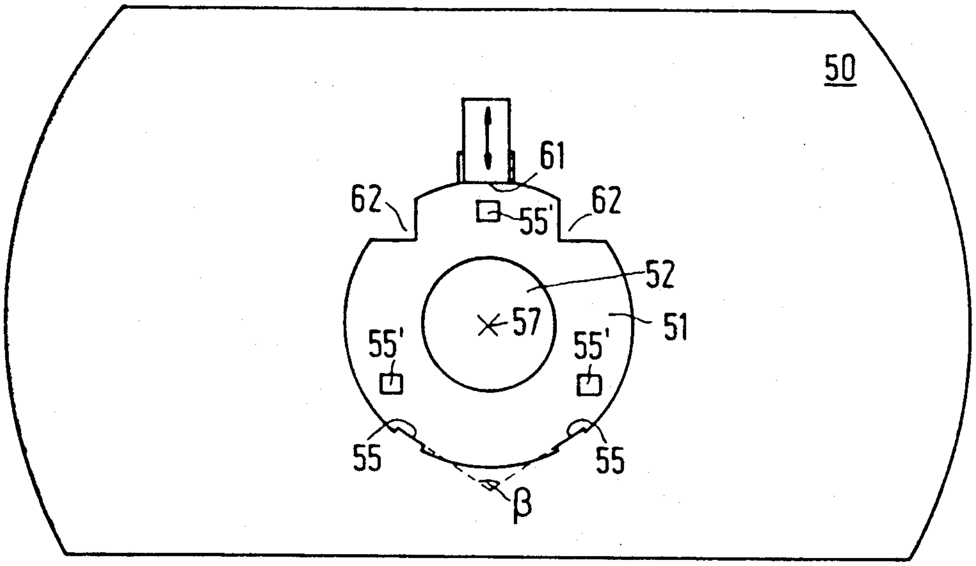
FIG. 4 shows the rear elevation of a reflector body in which the lamp vessel is supported.

In FIG. 4, a reflector body 50 has a recessed boundary 51 of an opening 52. This boundary comprises support surfaces 55 situated on the legs of a V having an obtuse angle $\beta$, which surfaces are to cooperate with the cylindrically flanged tongues 35 of FIGS. 2 and 3, and comprises elevations 55' which are to cooperate with the reference 35', so that the light source projects into the reflector body over the correct distance d (see FIG. 1). A pressure member 61 acting in the direction of the bisector of angle $\beta$ towards the support surfaces 55 is also present. Recess corners 62 are to cooperate with the tab 42. The support surfaces 55 together with the elevations 55' define the location and direction of a reference line, for example, the optical axis of the reflector body 57.

The reflector body is suitable for exchangeably accommodating a lamp having a positioning member according to FIG. 2 and 3, or for being permanently connected to such a lamp with, for example, solder, glue, glass enamel, or cement to form a sealed-beam lamp.

I claim:

1. A motor vehicle headlamp comprising a translucent lamp vessel (1) which is sealed in a vacuum-tight manner and is provided with an axis (2) and an end portion (3) having a seal;

a light source (4) having an axis (5) and positioned in the lamp vessel;

current supply conductors (6) which are connected to the light source and which extend from the lamp vessel to the exterior;

a holder body (10) provided with electrically mutually insulated contacts (11) facing away from the lamp vessel, which contacts are connected to the current supply conductors (6);

a metal retaining member (12) which is fastened to the end portion (3) of the lamp vessel (1) without cement, which retaining member has a portion (13) which extends alongside the axis of the lamp vessel;

a positioning member ((14), (34)) having reference tabs ((15), (35)) for positioning the lamp vessel (1) inside a reflector body;

a metal coupling member (16) connected to the positioning member ((14), (34)) and telescopically fastened to the retaining member (12), characterized in that the positioning member ((14), (34)) is a separate metal part of the holder body (10), to which the coupling member (16) is fastened, and in that the coupling member (16), before being fastened to the positioning member ((14), (34)) can be shifted in mutually perpendicular directions over a surface (19) of this positioning member ((14), (34)).

2. A motor vehicle headlamp as claimed in claim 1, characterized in that the coupling member (16) has an outwardly flanged rim (20) which is in contact with the positioning member ((14), (34)).

3. A motor vehicle headlamp as claimed in claim 1 or 2, characterized in that the positioning member ((14), (34)) is plate shaped and carries the contacts (11) of the holder body (10).

4. A motor vehicle headlamp as claimed in claim 1, characterized in that the positioning member ((14), (34)) has a first and a second circumference portion (35), which portions lie on one and the same circle, are cylindrically flanged, and form an acute angle ($\alpha$) with one another.

5. A motor vehicle headlamp as claimed in claim 4, characterized in that the positioning member ((14), (34)) has a flanged tongue (41) opposite the first and the second circumference portions (35).

6. A motor vehicle headlamp as claimed in claim 5, characterized in that the positioning member ((14), (34)) has a projecting tag (42) at its circumference.

7. A reflector body (50) for a headlamp as claimed in claim 1, said reflector body having an opening (52) therein with a boundary (51); the boundary having first and second support surfaces (55) which cooperate with the reference tabs ((15), (35)) of the positioning member ((14), (34)) when the headlamp is placed in the reflector body, said support surfaces lying on legs of a V having an obtuse angle ($\beta$); the boundary futher having a pressure member (61) positioned opposite said support surfaces and which is adapted to bear against a flanged tongue (41) of the positioning member ((14), (34)) when the headlamp is placed in the reflector body so as to maintain the headlamp in position.

* * * * *